US008725589B1

(12) United States Patent
Skelding et al.

(10) Patent No.: US 8,725,589 B1
(45) Date of Patent: May 13, 2014

(54) METHODS FOR PERSONALIZING MULTI-LAYER TRANSACTION CARDS

(75) Inventors: Dori K. Skelding, Dublin, CA (US);
Walter Brent Reinhard, Lansdale, PA (US); William Frederick Mann, III, Avondale, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 639 days.

(21) Appl. No.: 12/718,721

(22) Filed: Mar. 5, 2010

Related U.S. Application Data

(60) Provisional application No. 61/230,071, filed on Jul. 30, 2009.

(51) Int. Cl.
*G06Q 30/00* (2012.01)

(52) U.S. Cl.
USPC ............... 705/26.5; 705/38; 156/42; 156/60; 283/72

(58) Field of Classification Search
USPC ........ 705/26.1–27.2, 35, 38; 156/42, 60, 172, 156/185; 219/68; 359/2; 283/67, 72, 109
See application file for complete search history.

(56) References Cited

U.S. PATENT DOCUMENTS

| | | |
|---|---|---|
| 3,713,235 A | 1/1973 | Roberts |
| 3,855,033 A | 12/1974 | Staats |
| 4,022,943 A | 5/1977 | Erb et al. |
| D259,048 S | 4/1981 | Peterson |
| 4,380,699 A | 4/1983 | Monnier et al. |
| D270,546 S | 9/1983 | Malmberg |
| 4,420,174 A * | 12/1983 | Phelps et al. .................... 283/75 |
| 4,479,995 A | 10/1984 | Suzuki et al. |
| 4,545,838 A | 10/1985 | Minkus et al. |
| 4,575,127 A | 3/1986 | Michel |
| 4,605,844 A | 8/1986 | Haggan |
| 4,614,861 A | 9/1986 | Pavlov et al. |
| 4,643,452 A | 2/1987 | Chang |
| 4,647,714 A | 3/1987 | Goto |
| 4,648,189 A | 3/1987 | Michel |
| 4,650,981 A | 3/1987 | Foletta |
| 4,697,072 A | 9/1987 | Kawana |
| 4,701,601 A | 10/1987 | Francini et al. |

(Continued)

FOREIGN PATENT DOCUMENTS

| | | |
|---|---|---|
| DE | 19702532 | 3/1998 |
| DE | 102006015818 | 10/2007 |

(Continued)

OTHER PUBLICATIONS

Excerpt: Article from Plastics Engineering. Jan. 1987. pp. 29-32. "Calendering is still king for highvolume PVC sheet". H+Gust, Stephen J.*

*Primary Examiner* — William Allen
(74) *Attorney, Agent, or Firm* — Hunton & Williams LLP

(57) ABSTRACT

Exemplary embodiments provide a transaction card that may have multiple layers contained therein. The layers may include a metal sub-assembly core. The transaction card may be engraved, prior to providing to a cardholder, with a replica of the cardholder's actual signature. Additional items may be personalized upon the transaction card. The transaction card may also be incorporated into a system whereupon the transaction card may be triggered to perform an action such as emitting an audible tone or an electronic communication being sent to the cardholder.

10 Claims, 9 Drawing Sheets

(56) References Cited

U.S. PATENT DOCUMENTS

| | | |
|---|---|---|
| 4,707,594 A | 11/1987 | Roth |
| 4,746,787 A | 5/1988 | Suto et al. |
| 4,747,620 A | 5/1988 | Kay et al. |
| 4,752,676 A | 6/1988 | Leonard et al. |
| 4,754,418 A | 6/1988 | Hara |
| 4,755,661 A | 7/1988 | Ruebsam |
| 4,766,293 A | 8/1988 | Boston |
| 4,777,563 A | 10/1988 | Teraoka et al. |
| 4,856,857 A | 8/1989 | Takeuchi et al. |
| 4,897,533 A | 1/1990 | Lyszczarz |
| D305,887 S | 2/1990 | Nishimura |
| 4,928,001 A | 5/1990 | Masada |
| 4,931,623 A | 6/1990 | Nakamura et al. |
| 4,938,830 A | 7/1990 | Canniatra |
| 1,731,038 A | 9/1990 | Michels et al. |
| 4,954,985 A | 9/1990 | Yamazaki |
| 4,968,873 A | 11/1990 | Dethloff et al. |
| 4,978,401 A | 12/1990 | Bonomi |
| 5,049,728 A | 9/1991 | Rovin |
| 5,055,662 A | 10/1991 | Hasegawa |
| 5,095,194 A | 3/1992 | Barbanell |
| 5,180,901 A | 1/1993 | Hiramatsu |
| 5,192,947 A | 3/1993 | Neustein |
| 5,276,311 A | 1/1994 | Hennige |
| 5,359,183 A | 10/1994 | Skodlar |
| 5,383,687 A | 1/1995 | Suess et al. |
| 5,412,192 A | 5/1995 | Hoss |
| D359,305 S | 6/1995 | Finkelstein |
| 5,450,491 A | 9/1995 | McNair |
| 5,466,919 A | 11/1995 | Hovakimian |
| 5,477,038 A | 12/1995 | Levine et al. |
| 5,489,123 A | 2/1996 | Roshkoff |
| 5,495,981 A | 3/1996 | Warther |
| 5,511,114 A | 4/1996 | Stimson et al. |
| 5,521,363 A | 5/1996 | Tannenbaum |
| 5,530,232 A | 6/1996 | Taylor |
| 5,530,235 A | 6/1996 | Stefik et al. |
| 5,532,689 A | 7/1996 | Bueno |
| 5,577,109 A | 11/1996 | Stimson et al. |
| 5,578,808 A | 11/1996 | Taylor |
| 5,585,787 A | 12/1996 | Wallerstein |
| 5,649,118 A | 7/1997 | Carlisle et al. |
| 5,684,291 A | 11/1997 | Taskett |
| 5,689,100 A | 11/1997 | Carrithers et al. |
| 5,705,798 A | 1/1998 | Tarbox |
| 5,710,458 A | 1/1998 | Iwasaki |
| 5,721,768 A | 2/1998 | Stimson et al. |
| 5,721,781 A | 2/1998 | Deo et al. |
| 5,728,998 A | 3/1998 | Novis et al. |
| 5,734,154 A | 3/1998 | Jachimowicz et al. |
| 5,736,728 A | 4/1998 | Matsubara |
| 5,760,361 A | 6/1998 | Dew et al. |
| 5,770,843 A | 6/1998 | Rose et al. |
| 5,770,849 A | 6/1998 | Novis et al. |
| 5,777,305 A | 7/1998 | Smith et al. |
| 5,777,306 A | 7/1998 | Masuda |
| 5,777,903 A | 7/1998 | Piosenka et al. |
| D396,882 S | 8/1998 | Neal |
| 5,789,733 A | 8/1998 | Jachimowicz et al. |
| 5,815,658 A | 9/1998 | Kuriyama |
| 5,857,079 A | 1/1999 | Claus et al. |
| 5,864,830 A | 1/1999 | Armetta et al. |
| 5,883,377 A | 3/1999 | Chapin, Jr. |
| 5,883,810 A | 3/1999 | Franklin et al. |
| D408,054 S | 4/1999 | Leedy, Jr. |
| 5,901,303 A | 5/1999 | Chew |
| 5,907,142 A | 5/1999 | Kelsey |
| 5,907,350 A | 5/1999 | Nemirofsky |
| 5,920,844 A | 7/1999 | Hotta et al. |
| 5,953,710 A | 9/1999 | Fleming |
| 5,955,961 A | 9/1999 | Wallerstein |
| 5,984,180 A | 11/1999 | Albrecht |
| 5,984,191 A | 11/1999 | Chapin, Jr. |
| 5,988,509 A | 11/1999 | Taskett |
| 6,000,608 A | 12/1999 | Dorf |
| 6,006,988 A | 12/1999 | Behrmann et al. |
| 6,016,954 A | 1/2000 | Abe et al. |
| 6,019,284 A | 2/2000 | Freeman et al. |
| 6,025,283 A | 2/2000 | Roberts |
| 6,032,136 A | 2/2000 | Brake, Jr. et al. |
| 6,036,099 A | 3/2000 | Leighton |
| 6,045,042 A | 4/2000 | Ohno |
| 6,049,463 A | 4/2000 | O'Malley et al. |
| 6,068,183 A | 5/2000 | Freeman et al. |
| D427,167 S | 6/2000 | Iwasaki |
| 6,134,309 A | 10/2000 | Carson |
| 6,138,917 A | 10/2000 | Chapin, Jr. |
| D434,041 S | 11/2000 | Burke |
| 6,142,640 A | 11/2000 | Schofield |
| 6,145,741 A | 11/2000 | Wisdom et al. |
| 6,164,548 A | 12/2000 | Curiel |
| 6,169,975 B1 | 1/2001 | White et al. |
| 6,188,309 B1 | 2/2001 | Levine |
| 6,189,787 B1 | 2/2001 | Dorf |
| 6,213,392 B1 | 4/2001 | Zuppicich |
| D442,627 S | 5/2001 | Webb et al. |
| D449,336 S | 10/2001 | Webb et al. |
| 6,298,336 B1 | 10/2001 | Davis et al. |
| 6,315,193 B1 | 11/2001 | Hogan |
| 6,382,677 B1 | 5/2002 | Kaule et al. |
| 6,402,039 B1 | 6/2002 | Freeman et al. |
| 6,422,462 B1 | 7/2002 | Cohen |
| 6,424,029 B1 | 7/2002 | Giesler |
| D462,477 S | 9/2002 | Osborne |
| 6,467,684 B2 | 10/2002 | Fite et al. |
| 6,471,128 B1 | 10/2002 | Corcoran et al. |
| 6,473,500 B1 | 10/2002 | Risafi et al. |
| D466,929 S | 12/2002 | Haas |
| D467,271 S | 12/2002 | Haas |
| D467,272 S | 12/2002 | Haas |
| 6,491,782 B1 | 12/2002 | Jaynes |
| D474,235 S | 5/2003 | Haas |
| 6,557,766 B1 | 5/2003 | Leighton |
| 6,561,657 B1 | 5/2003 | Schofield |
| D476,681 S | 7/2003 | Al Amri |
| D476,683 S | 7/2003 | Kilburn |
| D477,359 S | 7/2003 | Haas |
| 6,592,044 B1 | 7/2003 | Wong et al. |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,644,551 B2 | 11/2003 | Clayman et al. |
| 6,655,598 B1 | 12/2003 | Curiel |
| D485,573 S | 1/2004 | Li |
| D486,179 S | 2/2004 | True |
| D486,515 S | 2/2004 | True |
| 6,715,797 B2 | 4/2004 | Curiel |
| 6,726,813 B2 | 4/2004 | Kaule et al. |
| 6,727,802 B2 | 4/2004 | Kelly et al. |
| 6,732,919 B2 | 5/2004 | Macklin et al. |
| D493,195 S | 7/2004 | Creighton |
| 6,764,014 B2 | 7/2004 | Lasch et al. |
| D495,736 S | 9/2004 | Scharf |
| 6,802,008 B1 | 10/2004 | Ikefuji et al. |
| 6,805,287 B2 | 10/2004 | Bishop et al. |
| 6,865,547 B1 | 3/2005 | Brake, Jr. et al. |
| D505,450 S | 5/2005 | Lauer et al. |
| 6,895,386 B1 | 5/2005 | Bachman et al. |
| 6,924,026 B2 | 8/2005 | Jaynes |
| 6,942,156 B2 | 9/2005 | Ohta et al. |
| D517,602 S | 3/2006 | Brink et al. |
| 7,051,929 B2 | 5/2006 | Li |
| D523,472 S | 6/2006 | Brink et al. |
| 7,063,924 B2 | 6/2006 | Kaminsky et al. |
| 7,072,864 B2 | 7/2006 | Brake, Jr. et al. |
| D526,012 S | 8/2006 | Dorr et al. |
| D526,016 S | 8/2006 | Allard et al. |
| 7,104,443 B1 | 9/2006 | Paul et al. |
| D530,741 S | 10/2006 | Blossom |
| 7,128,272 B2 | 10/2006 | Doublet |
| D533,220 S | 12/2006 | Graves et al. |
| 7,163,153 B2 | 1/2007 | Blossom |
| D538,349 S | 3/2007 | Hollands |

(56) References Cited

U.S. PATENT DOCUMENTS

| | | |
|---|---|---|
| 7,191,952 B2 | 3/2007 | Blossom |
| D551,705 S | 9/2007 | Mershon |
| 7,306,163 B2 | 12/2007 | Scholz et al. |
| D562,888 S | 2/2008 | Brown et al. |
| 7,357,331 B2 | 4/2008 | Blossom |
| D572,305 S | 7/2008 | Lasch et al. |
| D576,671 S | 9/2008 | Field et al. |
| D582,476 S | 12/2008 | Field et al. |
| D582,977 S | 12/2008 | Field et al. |
| 7,479,320 B2 | 1/2009 | Keller et al. |
| 7,494,057 B2 | 2/2009 | Lasch et al. |
| 7,503,503 B2 | 3/2009 | Riedl et al. |
| 7,530,491 B2 | 5/2009 | Lasch et al. |
| 7,588,184 B2 | 9/2009 | Gandel et al. |
| 7,591,416 B2 | 9/2009 | Blossom |
| D602,522 S | 10/2009 | Field et al. |
| D602,986 S | 10/2009 | Skelding et al. |
| 2001/0049416 A1* | 12/2001 | Choulet ..................... 525/70 |
| 2002/0116330 A1 | 8/2002 | Hed et al. |
| 2003/0053609 A1 | 3/2003 | Risafi et al. |
| 2003/0085286 A1 | 5/2003 | Kelley et al. |
| 2003/0200180 A1 | 10/2003 | Phelan, III et al. |
| 2003/0218066 A1 | 11/2003 | Fernandes et al. |
| 2004/0024672 A1 | 2/2004 | Brake, Jr. et al. |
| 2006/0097036 A1* | 5/2006 | Koenigsman et al. ........ 235/379 |
| 2007/0020443 A1 | 1/2007 | Lo |
| 2007/0034689 A1* | 2/2007 | Jaros et al. .................... 235/380 |
| 2007/0098965 A1* | 5/2007 | Hoshiyama ............... 428/195.1 |
| 2007/0246526 A1* | 10/2007 | Elgar et al. .................... 235/380 |
| 2008/0187770 A1 | 8/2008 | Funicelli et al. |
| 2008/0245865 A1 | 10/2008 | Mosteller |
| 2008/0313205 A1* | 12/2008 | Elgar et al. .................... 707/102 |
| 2009/0230195 A1* | 9/2009 | Lasch et al. ................... 235/488 |
| 2009/0242645 A1 | 10/2009 | Komatsu et al. |
| 2009/0250522 A1 | 10/2009 | Williams et al. |
| 2009/0261161 A1 | 10/2009 | Blossom |
| 2010/0217674 A1* | 8/2010 | Kean .............................. 705/17 |
| 2011/0258070 A1* | 10/2011 | Lynch et al. ................. 705/26.5 |

FOREIGN PATENT DOCUMENTS

| | | |
|---|---|---|
| JP | 53118104 | 10/1978 |
| JP | 1087397 | 3/1989 |
| JP | 03114879 | 5/1991 |
| JP | 04073193 | 3/1992 |
| JP | 04201392 | 7/1992 |
| JP | 05011676 | 1/1993 |
| JP | 8080680 | 3/1996 |
| JP | 8096098 | 4/1996 |
| JP | 10116016 | 5/1998 |
| JP | 2000113151 | 4/2000 |
| JP | 2002259933 | 9/2002 |
| JP | 2002366015 | 12/2002 |
| JP | 2005246658 | 9/2005 |
| JP | 2008015071 | 1/2008 |
| WO | 97/20692 | 12/1996 |
| WO | 2007/115725 | 10/2007 |

* cited by examiner

500

500

METHODS FOR PERSONALIZING MULTI-LAYER TRANSACTION CARDS

RELATED APPLICATIONS

This application claims priority to U.S. Provisional Patent Application Ser. No. 61/230,071 filed Jul. 30, 2009, the disclosure of which is incorporated herein in its entirety.

FIELD OF THE INVENTION

Embodiments of the invention relate generally to transaction cards. More specifically, embodiments are directed to a multi-layer transaction card that may be composed of various layers including a metal sub-assembly. The transaction card may have additional features, such as laser etching of the cardholder's signature.

BACKGROUND OF THE INVENTION

Typically, transaction cards are made of a single layer of plastic. These plastic cards include a variety of design elements that provide the cards with a particular appearance, and also identify the entity or entities issuing the cards. Account information, such as the cardholder's name and account number, are added on at least the front surface of the card, for example, by embossing, engraving, or other printing. Many transaction cards, such as typical credit, debit, or stored value cards, include a magnetic strip or tape that is located on the back surface of the card. Some transaction cards may have a Radio Frequency Identification (RFID) chip or a computer chip included in addition to the magnetic strip. Certain card types have only an RFID chip and/or a computer chip, for example a 'smart card.' The back side of the transaction card has a signature panel to which the cardholder affixes their signature upon receipt of the card. The cardholder affixes their signature for security purposes so that during a transaction a merchant is able to verify the identity of the cardholder to prevent fraud. The signature panel is typically a plastic strip adhered to or embedded in the card. The cardholder affixes their signature through the use of a writing implement, such as a pen.

These plastic cards can contain three-dimensional designs or images typically formed on metallic foils or polymer films, such as a hologram. These images are used for security purposes to prove the genuineness of the card.

Transaction cards are also known to be composed of metal or contain metal in addition to plastic. For example, U.S. Pat. Nos. 6,764,014, 7,494,057, 7,530,491, and 7,588,184, as well as U.S. Patent Application Publication Number 2009/0230195, to the American Express Corporation, disclose metallic based transaction cards and methods of making the same. The disclosure of these patents and publication is hereby incorporated by reference in their entirety. These cards contain metal in various combinations and layers. The cards are laser engraved and/or etched and require the user to sign the card in a provided space as described above.

The aforementioned transaction cards, which include credit cards, debit cards, and stored value card, as well as other types of cards, such as data cards, have variant manufactured with multiple layers. These multi-layer cards include such materials as metal, foil, plastics, rubber, laminates, and adhesives. The cards are structured with the various layers to have certain characteristics, such as color, reflectivity, durability, and flexibility. U.S. Pat. Nos. 4,648,189, 4,479,995, 4,647,714, 6,491,782, 6,025,283, 6,644,551, 6,924,026 provide examples of such cards. The disclosure these references is incorporated herein in their entirety.

Layers, such as metallic layers, are used as to contain security features in these cards. For example, metallic layers are use for their spectral characteristics or to include holograms, as shown, for example, in U.S. Pat. Nos. 4,747,620, 4,865,857, 5,383,687, 6,382,677, 7,063,924, 7,503,503, U.S. Patent Publication No. 2008/0245865. The disclosure these references is incorporated herein in their entirety.

The aforementioned card types suffer from various deficiencies. For example, the signature affixed to the card by the cardholder becomes worn over time, even progressing to the point of unreadability due to the wear. Additionally, these cards lack a means to convey to the cardholder information associated with the transaction card, such as the balance status, and to remind the cardholder that the cardholder possesses the transaction card. In order to find out the remaining balance on a card, such as a stored value card for example, a cardholder has to have the card scanned at a point of sale device at a merchant.

SUMMARY OF THE INVENTION

An embodiment provides a transaction card that has a metal assembly, configured in the shape of a transaction card, having a first side and a second side, a first overlay layer and a second overlay layer located adjacent the first and second side of the metal assembly, a first printed layer and a second printed layer located adjacent the first and second overlay layer, and a first coating and a second coating located adjacent to the first and second printed layer.

An embodiment provides a computer implemented method for personalizing a transaction card. A request for a transaction card is received from a prospective cardholder. A signature of the prospective cardholder is received. The signature is engraved into the transaction card, wherein the signature is engraved into a layer of the transaction card. The transaction card is provided to the prospective cardholder wherein the prospective cardholder becomes a cardholder, and the transaction card is activated the transaction card at the request of the cardholder.

An embodiment provides a computer implement method for providing a transaction card to a customer, wherein the transaction card has a computer chip. A selection of one or more options associated with the transaction card is received from the customer. A communication signal is emitted, wherein the communication signal contains at least a predetermined code and is emitted from at least one transceiver. A signal from the transaction card is received and data is exchanged with the transaction card upon the transaction card acknowledging the predetermined code, wherein the exchange of data causes the transaction card to perform an action.

Advantages of this invention in addition to those described above are apparent from the following detailed description of exemplary embodiments of the invention.

Figure 1A:
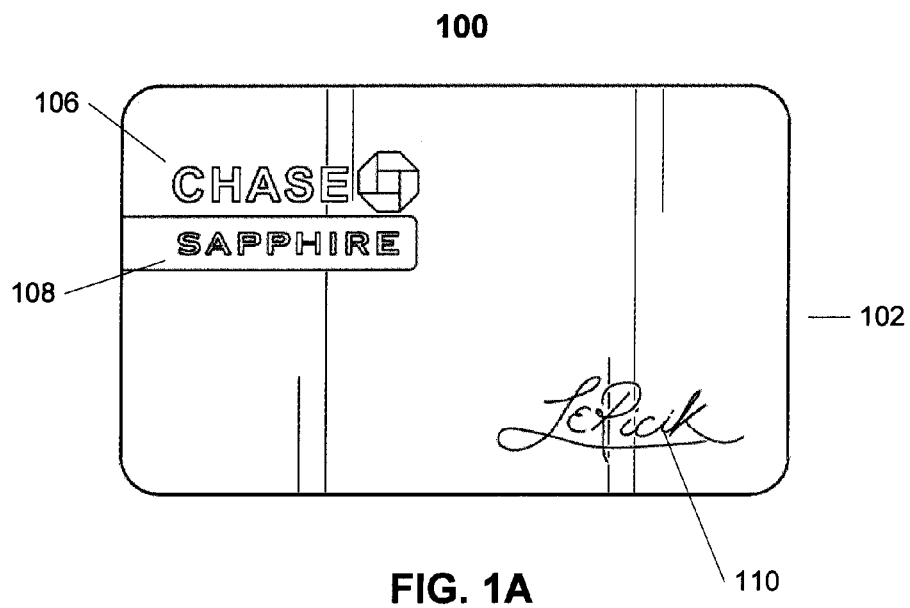
FIG. 1A is a front view of a transaction card in accordance with an exemplary embodiment.

These and other embodiments and advantages will become apparent from the following detailed description, taken in conjunction with the accompanying drawings, illustrating by way of example the principles of the various exemplary embodiments.

DETAILED DESCRIPTION OF THE PREFERRED EMBODIMENTS

It will be readily understood by those persons skilled in the art that the embodiments of the inventions described herein are capable of broad utility and application. Many embodiments and adaptations of the embodiments of the inventions other than those herein described, as well as many variations, modifications and equivalent arrangements, will be apparent from or reasonably suggested by the embodiments of the inventions and foregoing description thereof, without departing from the substance or scope of the invention.

Accordingly, while the embodiments of the invention have been described herein, in detail in relation to the exemplary embodiments, it is to be understood that this disclosure is illustrative and exemplary of embodiments of the invention and is made to provide an enabling disclosure of the invention. Accordingly, the subsequent disclosure is not intended to be construed to limit the embodiments of the invention or otherwise to exclude any other such embodiments, adaptations, variations, modifications and equivalent arrangements. While the various embodiments of the present invention are described in the context of a multi-layer transaction card, the embodiments described herein may be applied to other related items, such as other types of cards and the like.

Application of embodiments of the present invention may be primarily for transaction cards. However, one of ordinary skill in the art may appreciate application to other fields that use similar cards, such as driver licenses or other types of cards. The use of the terms "credit card," "debit card," "stored value card," "payment card," or the like in the present application is used for illustrative examples only, and is not meant to be limiting on the scope of the exemplary embodiments. Furthermore, the use of the term "credit" or "debit" or "stored value" in the exemplary embodiments is used merely for illustrative examples is not meant in any way to be limiting upon the exemplary embodiments.

The term signature may be used herein. This term may mean a representation in writing of a cardholder's name. For example, a signature may be a representation of the cardholder's first, middle, and last name. Initials may be used for the first and/or middle name. The representation is typically in a writing style. The writing style may be personal to the cardholder. By way of non-limiting example, the signature may be in a cursive or script writing style as depicted on the various Figures of exemplary embodiments described herein. The signature may be in a print style. A combination of writing styles may be used. Further, the signature may include symbols or other characters. For example, a signature may include a "III" or "Jr." as a suffix. The symbols and characters may be letters, numerals, artwork, glyphs, runes, widgets, clip art, smiley faces, emoticons, and the like. The limit on such symbols and characters may be reproducibility both onto the transaction card and by the cardholder themselves. These additional characters may be in any writing style. Some signatures may be a symbol or a combination of symbols and/or characters. Some signatures may include honorific titles. For example, a cardholder may include "Dr." or "Ph.D" with their signature. The signature may be reproducible both on the transaction card described herein and on transaction records as verification of the cardholder's identity. For example, a cardholder may be required to reproduce the signature, as it appears on the transaction card, with any symbols and/or characters included therewith, at a point of sale device to complete a transaction. The cardholder may apply their signature directly to the point of sale device, for example, by using a touch screen, or the cardholder may sign a hard copy of a transaction receipt. Such reproduction of a replica of the signature included with the transaction card may provide a way for a merchant to verify the identity of the cardholder and prevent fraud.

According to exemplary embodiments, a transaction card is provided. The transaction card may be suitable for use in debit transactions, credit transactions, ATM transactions, for use as a gift card, a stored value card, or a rewards card, as an identity card, and/or for other purposes. The transaction card may have one or more accounts associated with it. The transaction card may be associated with a secondary account which in turn in associated with a primary account. The transaction card may be issued by and/or associated with a financial institution or a like institution or business. For example, the transaction card may be associated with a bank or a credit union. Alternatively, the transaction card may be issued by a third party associated with the financial institution.

In one or more exemplary embodiments, the transaction card may be constructed of multiple layers. For example, the transaction card may incorporate a metal sub-assembly as a core sandwiched between one or more additional layers. The transaction card may have a protective coating applied to provide protection and durability for the transaction card. The metal sub-assembly may be shaped to match the form of a 'standard' transaction card. It should be appreciated that other such shapes are possible. The transaction card may have various colors and/or surface textures associated with it. For example, the metal sub-assembly may be colored. This color may be visible through the one or more additional layers between which the metal sub-assembly is located.

Referring to FIG. 1, a transaction card 100 is depicted. The transaction card 100 may have various features as described herein. The transaction card 100 may have the shape and dimensions of a typical transaction card. For example, the transaction card 100 may conform to ISO/IEC 7810:2003 ID-1. It should be appreciated the transaction card 100 may have other shapes and sizes. The transaction card 100 may be made from plastic, metal, or a combination thereof. It should be appreciated that the transaction card 100 may be made of other materials as appreciated by one of ordinary skill in the art. The transaction card 100 may have a front side 102 and a reverse side 104. The transaction card 100 may have one or more colors associated therewith. The material or materials for the transaction card 100 may be colorized or coated to have one or more colors. For example, the transaction card 100 may be a solid color. Alternatively, the transaction card 100 may have two or more colors and the two or more colors may be arranged in a pattern. The front side 102 and the reverse side 104 may be different colors. Further, the transaction card 100 may have a smooth surface or may have a textured surface. The front side 102 and the reverse side 104 may have different textures. The card may have an indicia 106 of a financial institution associated with the transaction card 100. For example, the indicia 106 may be a name and/or a logo associated with the transaction card 100. The transaction card 100 may have an indicia 108 of a specific card type and/or card family. For example, the transaction card 100 may be a card associated with a specific program, such as a card type, that is associated with the financial institution, such as a program named "Sapphire." Other programs and card types are possible. The transaction card 100 may have a signature 110 of a cardholder. The signature 110 may be located on the front side 102 or on the rear side 104 of the transaction card 100. The signature 110 may be affixed by various methods. For example, the cardholder may sign the card in a provided space or the signature 110 may be imprinted, engraved, embossed, or otherwise affixed to the transaction card 100 according to exemplary embodiments.

Figure 1B:
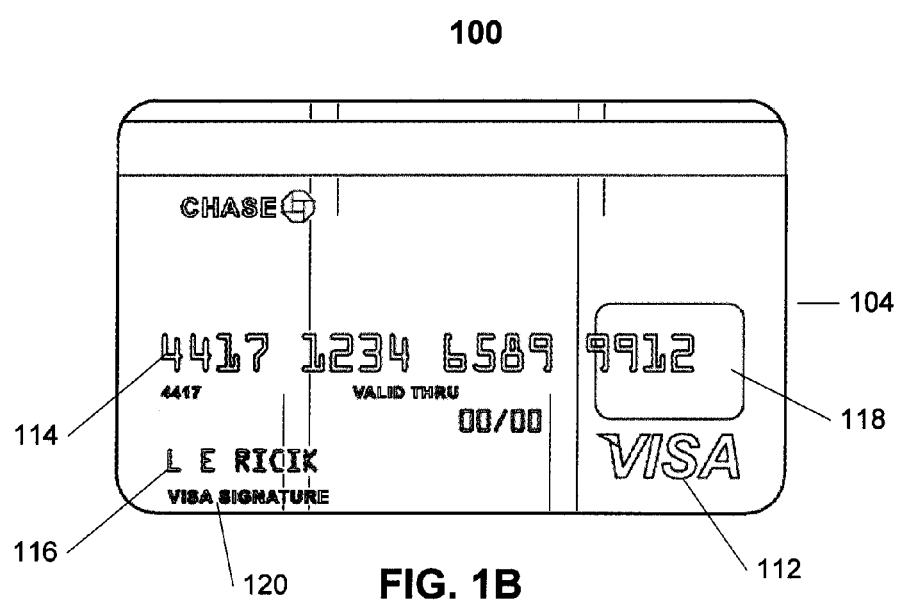
FIG. 1B is a rear view of a transaction card in accordance with an exemplary embodiment.

The transaction card 100 may further have an indicia 112 of a predetermined transaction network. For example, the predetermined transaction network may be the Visa or Master-Card network. It should be appreciated that the transaction card 100 may be associated with other similar transaction networks. The transaction card 100 may have an account number 114 thereon. The account number 114 may be imprinted, embossed, engraved, or otherwise affixed on the transaction card 100 and may be located on the front side 102 or the rear side 104. The transaction card 100 may have a printed name 116 of the cardholder. The printed name 116 may be located on the front side 102 or the rear side 104. The printed name 116 may have the cardholder's full name or it may be a shortened form of the cardholder's name. For example, a first initial and a middle initial may be used as depicted in FIG. 1B. The printed name 116 may correspond to the name used in the signature 110. For example, if the signature 110 uses the first initial and the middle initial of the cardholder, vice spelling out the full name of the cardholder, the printed name 116 may correspond thereto. The printed name 116 may be imprinted, embossed, engraved, or otherwise affixed on the transaction card 100. It should be appreciated that the printed name may include symbols or characters that the cardholder may have associated with their name. For example, the printed name may match how a cardholder signs their name such as by including a suffix, such as "Jr." or "M.D.", or a symbol, such as ":-)".

The transaction card 100 may have a hologram 118 embedded therein for security purposes. The hologram 118 may be associated with the predetermined transaction network indicia 112 as described above. The hologram 118 may be used to ensure the authenticity of the card. The transaction card 100 may have an additional indicia 120 relating to a card type. For example, the transaction card 100 may have an indicia 120 indicating that the transaction card 100 is a Visa Signature Card.

Figure 2A:
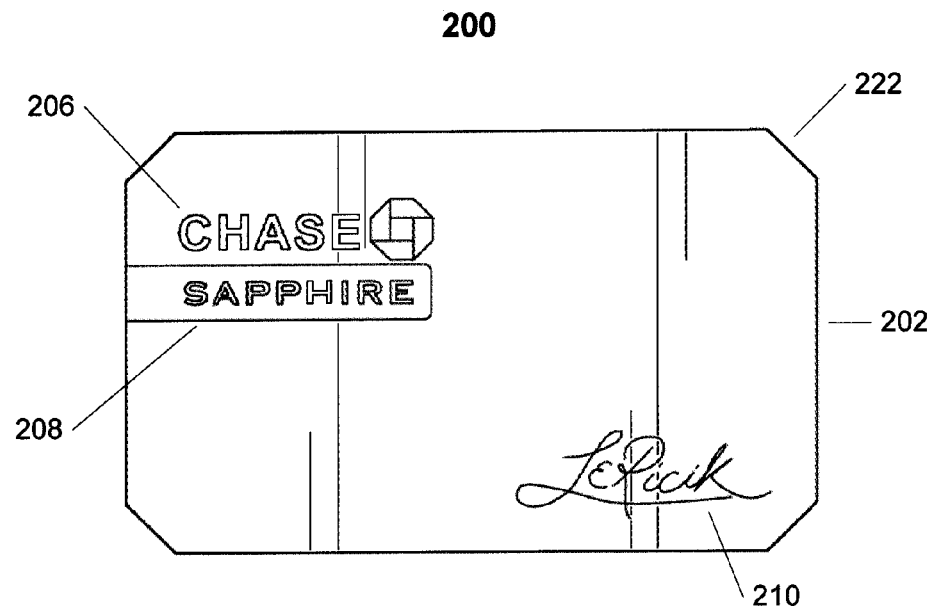
FIG. 2A is a front view of a transaction card in accordance with an exemplary embodiment.
Figure 2B:
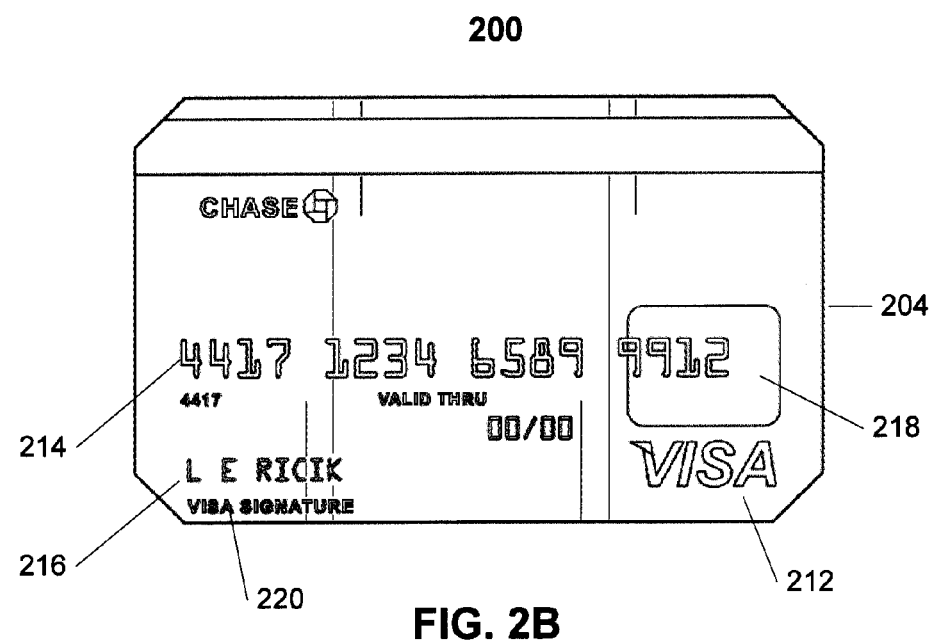
FIG. 2B is a rear view of a transaction card in accordance with an exemplary embodiment.

Referring to FIG. 2, a transaction card 200 is depicted exemplary embodiments. The transaction card 200 may have similar features to the transaction card 100, as described above. The transaction card 200 may differ in structure from the transaction card 100. For example, the transaction card 200 may have cropped corners 222 as depicted in FIG. 2. The transaction card 200 may be made from plastic, metal, or a combination thereof. It should be appreciated that the transaction card 200 may be made of other materials as appreciated by one of ordinary skill in the art. The transaction card 200 may have features 202, 204, 206, 208, 210, 212, 214, 216, 218, and 220 which correspond to the similarly numbered features, albeit with a prefix of 1, shown for the transaction card 100 in FIG. 1. The transaction card 200 may incorporate colors, patterns, and/or textures as described for the transaction card 100.

Figure 3A:
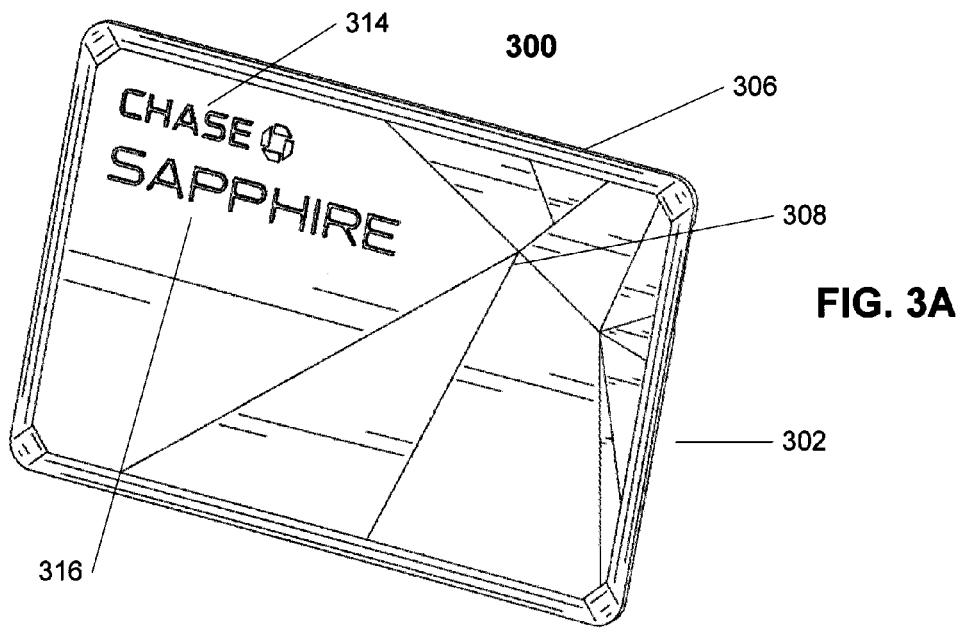
FIG. 3A is a front perspective view of a transaction card in accordance with an exemplary embodiment.

Referring to FIG. 3, a transaction card 300 is depicted according to an exemplary embodiment. The transaction card 300 may be made of metal according to exemplary embodiments. Alternatively, the transaction card 300 may be made of plastic, metal, or a combination of metal and plastic. The transaction card 300 may be the size of a typical transaction card, such as defined above for the transaction card 100. The transaction card 300 may have a front face 302 and a rear face 304. The transaction card 300 may incorporate colors, patterns, or textures as described above for the transaction card 100. The metal may be colorized and/or coated. The front face 302 may have a beveled edge 306 around its perimeter. The front face 302 may have a design 308 thereupon. The design 308 may be imprinted or engraved upon the front face 302. In some embodiments, the design 308 may be a part of the material of the transaction card. For example, the design 308 may include lines and texturing lending the appearance of a gem to the transaction card 300.

Figure 3B:
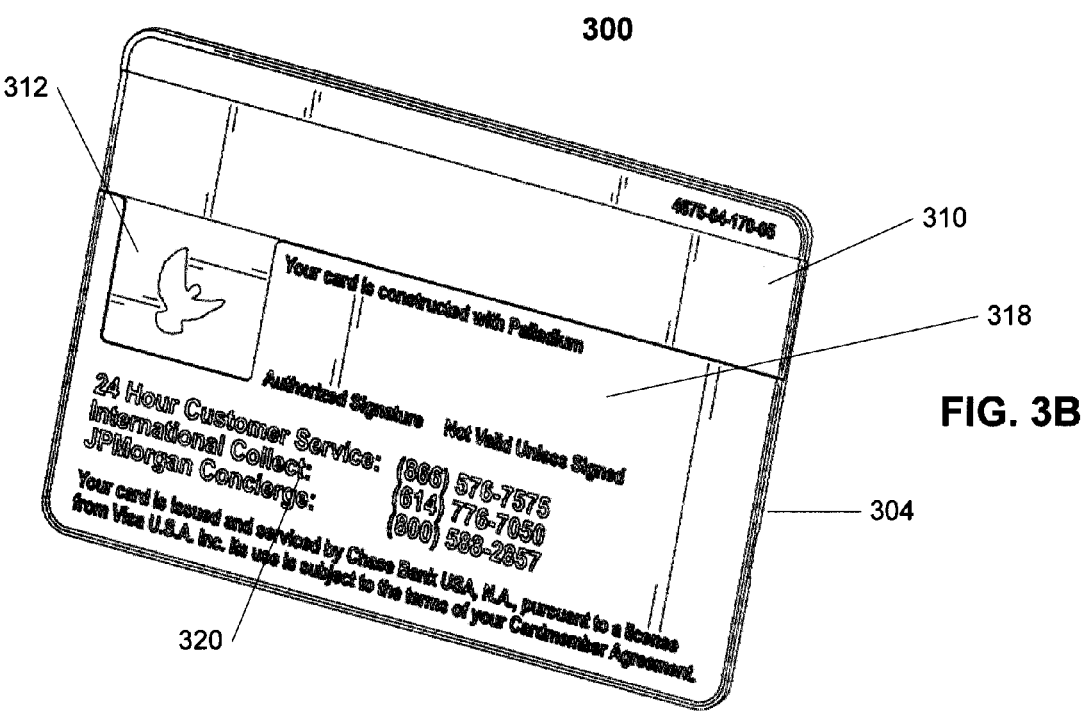
FIG. 3B is a rear perspective view of a transaction card in accordance with an exemplary embodiment.

The rear face 304 may have various physical features. The rear face 304 may have a cut-out 310. The cut-out 310 may contain the magnetic stripe (not shown). A pocket 312 may be located on the rear face 304. The pocket 312 may be used for various functions. For example, the pocket 312 may contain a hologram or a radio frequency identification (RFID) chip, or a similar communications chip, or other type of computer chip, such as a smart card chip. The pocket 312 may be located as depicted in FIG. 3B. Alternatively, the pocket 312 may be located at another location on the rear face 304. The pocket 312 may be located on the front face 302. The transaction card 300 may have more than one pocket 312.

The transaction card 300 may have other various features. The transaction card 300 may have indicia 314 and 316 located thereon. The indicia 314 may be a financial institution name and/or logo or other identifying mark. The indicia 316 may be a card type or card line. The indicia 314 and 316 may be raised lettering extending in a perpendicular direction outward from the front face 302. The indicia 314 and 316 may be additional indicia such as a pre-determined transaction network indicia. The indicia 314 and 316 may be located at various locations on the transaction card 300, including on the rear face 304. The indicia 314 and 316 may be located upon both the front face 302 and the rear face 304.

The transaction card 300 may have a signature space 318 on the rear face 304. The rear face 304 may have indicia 320 located thereon with various information for the cardholder and about the transaction card 300, as shown in FIG. 3B.

Figure 4A:
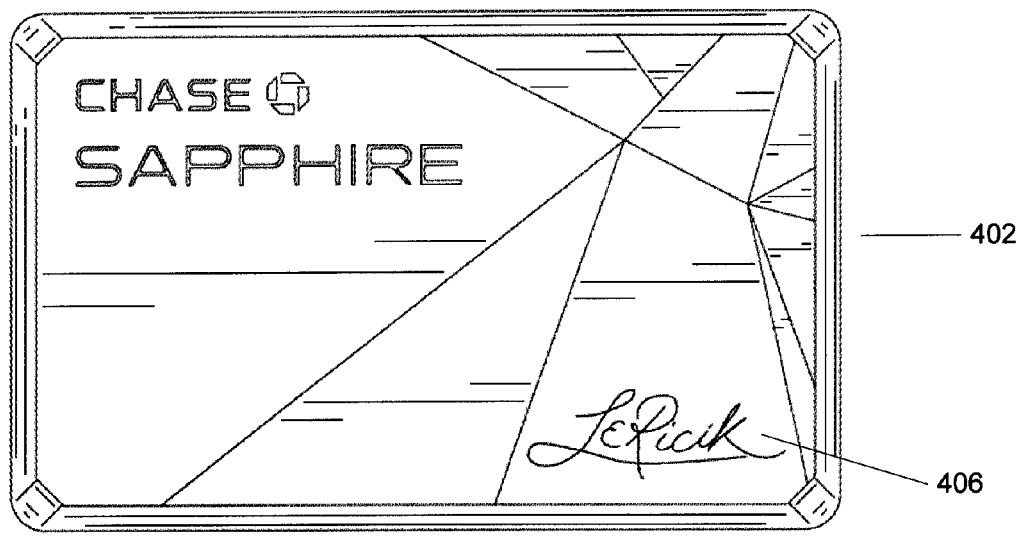
FIG. 4A is a front view of a transaction card in accordance with an exemplary embodiment.
Figure 4B:
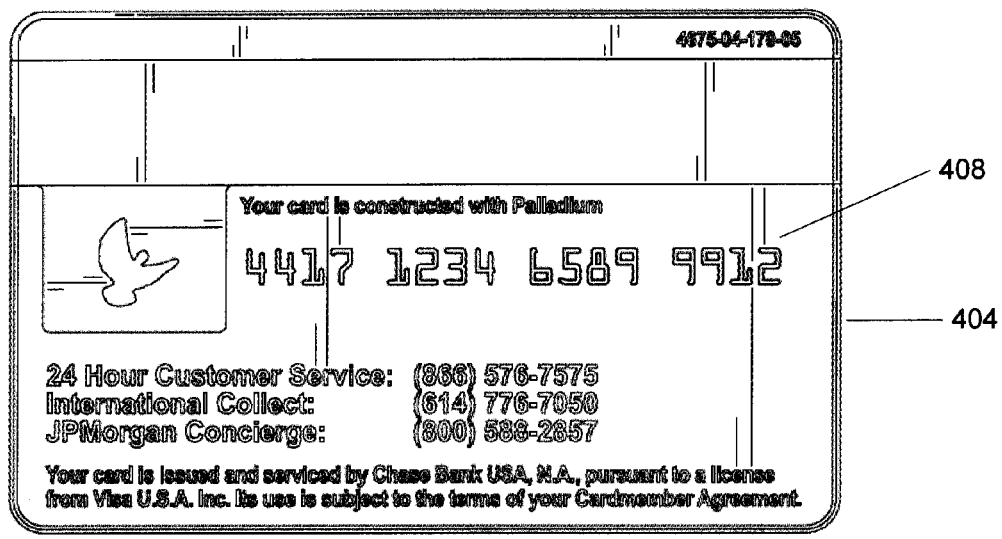
FIG. 4B is a rear view of a transaction card in accordance with an exemplary embodiment.

FIG. 4 depicts a transaction card 400 according to exemplary embodiments. The transaction card 400 may have a similar structure to the transaction card 300 as described above. The transaction card 400 may be made of metal. The transaction card 400 may be colored with one or more colors.

A pattern of colors may be used. The metal may be colorized and/or coated. The transaction card 400 may have a surface texture. The transaction card 400 may have a signature 406 of a cardholder located upon a front face 402. The transaction card 400 may have an account number 408 of an account associated with the transaction card 400 located on a rear face 404. The signature 406 and account number 408 may be imprinted, embossed, engraved, or otherwise affixed upon the transaction card 400. Each of the signature 406 and the account number 408 may be affixed to the transaction card 400 by different means as described herein. For example, the signature 406 may be engraved and the account number 408 may be embossed or vice versa. Other such combinations are possible.

Figure 5A:
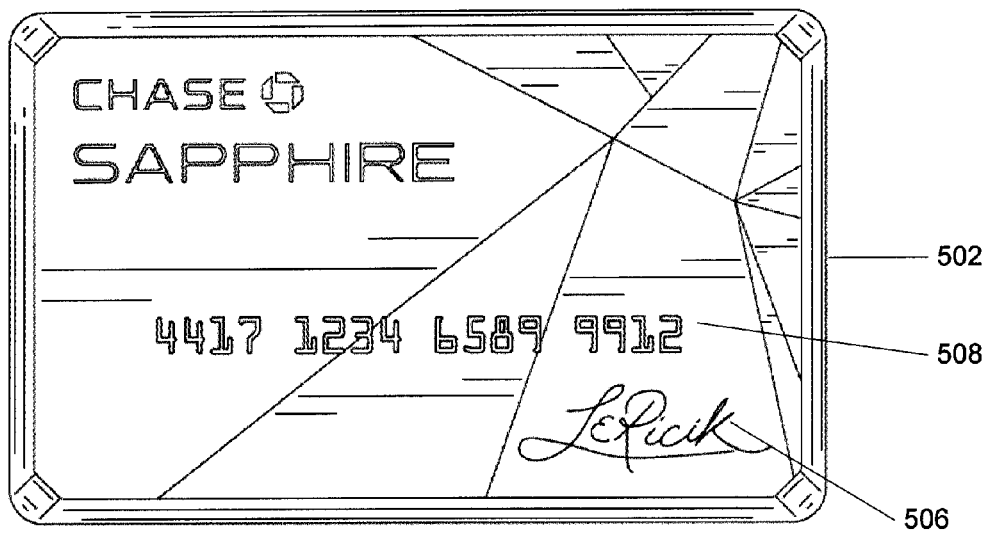
FIG. 5A is a front view of a transaction card in accordance with an exemplary embodiment.

FIG. 5 depicts a transaction card 500 according to exemplary embodiments. The transaction card 500 may have a similar structure to the transaction card 300 as described above, including a front face 502 and a rear face 504. The transaction card 500 may be made of metal. The transaction card 500 may be colored with one or more colors, and may have a surface texture. The metal may be colorized and/or coated. The transaction card 500 may have a signature 506 of a cardholder located upon the front face 502. The transaction card 500 may have an account number 508 of an account associated with the transaction card 500 located on the front face 502. The signature 506 and account number 508 may be imprinted, embossed, engraved, or otherwise affixed upon the transaction card 500. Each of the signature 506 and the account number 508 may be affixed to the transaction card 500 by different means. For example, the signature 506 may be engraved and the account number 508 may be embossed or vice versa. Other such combinations are possible. The signature 506 and the account number 508 may be located in different positions upon the transaction card 500 in different orientations from that shown in FIG. 5A.

Figure 5B:
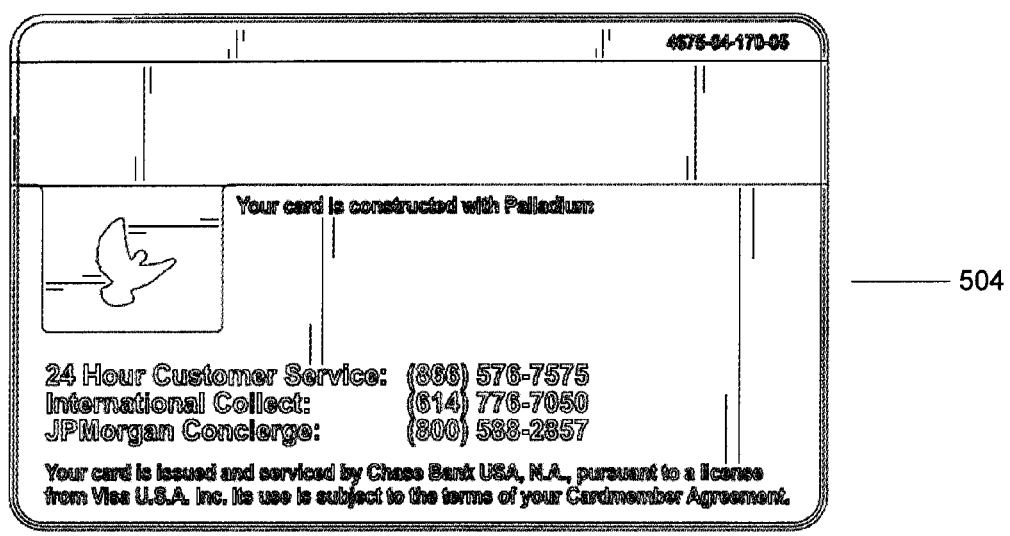
FIG. 5B is a rear view of a transaction card in accordance with an exemplary embodiment.

As can be seen in FIG. 5B, the rear face 504 may not have an account number or a signature located thereupon. Alternatively, the signature 506 and/or the account number 508 may be duplicated upon the rear face 504. The printed name of the cardholder may be located upon the rear face 504 in some embodiments. Further, an indicia of a predetermined transaction network may be located upon the transaction card 500, on the front face 502 and/or the rear face 504.

Figure 6B:
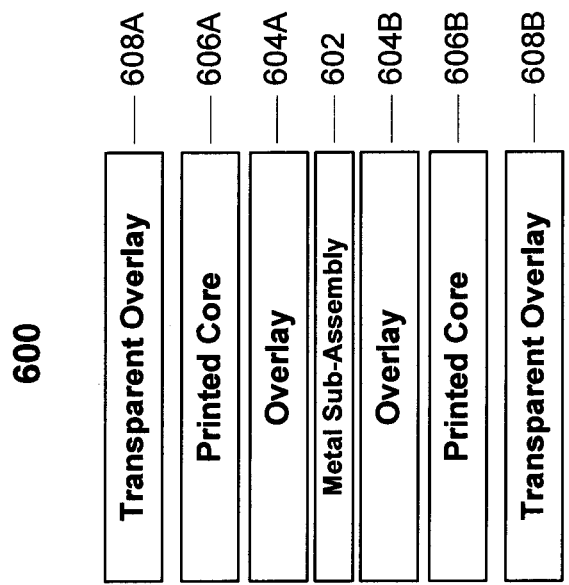
FIG. 6B is a side view of a transaction card layer structure in accordance with an exemplary embodiment.
Figure 6A:
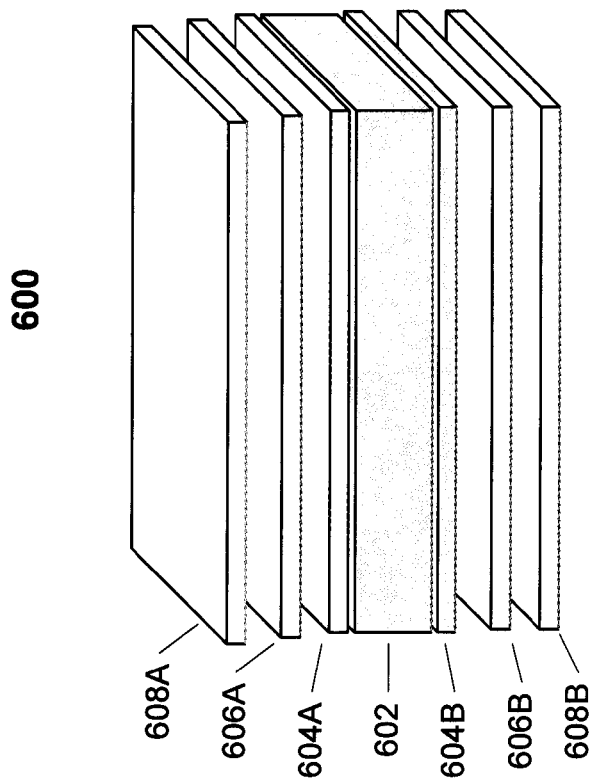
FIG. 6A is a perspective view of a transaction card layer structure in accordance with an exemplary embodiment.

Referring to FIG. 6, a layer structure 600 for a transaction card according to exemplary embodiments is depicted. The layer structure 600 may be used for the embodiments of transaction cards described herein. The layer structure may have multiple layers 604, 606, and 608 around a metal sub-assembly or metal core 602. The layers may be located on either side of the metal sub-assembly 602 in a symmetric manner as shown in FIG. 6. For example, the metal sub-assembly 602 may have an overlay layer 604 located above and below it. Next, a printed core layer 606 may be located on either side of the layer 604. Finally, a transparent overlay layer 608 may be located on either side of the layer 606. It should be appreciated that the layer structure 600 may have additional layers on top of the layers shown in FIG. 600 or between the layer structure 600.

The metal sub-assembly 602 may have a central metal layer or metal core, which may contain a top overlay layer and a bottom overlay layer 604A and 604B, which may be separate layers as shown in FIG. 6 or may be integrated with the metal sub-assembly 602. The metal sub-assembly may be of varying thicknesses. For example, the metal sub-assembly may be eighteen mil thick. The top overlay layer and/or bottom overlay layer may be laminated layers. These overlay layers may be made of various materials. For example, the top and bottom overlay layers 604 may be comprised of polyvinyl chloride (PVC), polyester, other plastics, glass, metal, and/or combinations of these materials.

According to exemplary embodiments, the metal sub-assembly 602 may provide additional functionality for the transaction card. For example, the metal sub-assembly 602 may provide shielding. The shielding properties of the metal sub-assembly 602 may provide shielding from EMI (Electromagnetic Interference) and/or RFI (Radio Frequency Interference). The metal sub-assembly 602 may provide other functionality. For example, the metal sub-assembly may provide rigidity and structural integrity to the transaction card which may enable a longer life for the card and increased durability. The metal sub-assembly 602 may have one or more sides with a highly polished finish. Such a highly polished finish may serve as a mirrored surface which may be visible even through one or more overlay layers of the layer structure 600. For example, such a mirrored finish of the metal sub-assembly 602 may be utilized for makeup, grooming, signaling, or other purposes. Alternatively, the metal sub-assembly 602 may contain one or more sides with other types of finishes. For example, the metal sub-assembly 602 may be finished to provide a gem-like surface appearance, such as having a finish that appears as facets of a gem, like a cut sapphire or diamond. This finish may provide the appearance of the transaction card 300, 400, and 500 as shown in FIGS. 3 through 5, for example. It should be appreciated that other types of finishes are possible. For example, the metal sub-assembly 602 may have a finish to give the appearance of cast iron or another substance. The appearance of the metal-sub assembly 602 may be a property of the material itself or the appearance may be added during manufacturing. The appearance may be a combination of the material properties and added finishing. In addition to finish surface appearance, the metal sub-assembly may be colored with one or more colors. For example, the metal sub-assembly may be colored blue or a combination of blue and white. Multiple shades and/or multiple colors may be used. The color may be a property of the metal sub-assembly 602 material or it may be added thereto during manufacturing. The color may be a combination of the preceding. The color may be added to the metal through various processes. For example, physical vapor deposition may be used to coat the metal sub-assembly.

According to various embodiments, one or more portions of the metal sub-assembly 602 may function as an antennae which may be connected to additional components of the card. Components may include an interface, such as an RFID interface (e.g., either passive or active) or similar interface. The card may contain one or more integrated circuit chips, memory and other components, which may be embedded in and/or mounted on the metal sub-assembly 602. The metal sub-assembly 602 may contain one or more cut-outs to accommodate such components. For example, a cut-out as shown in FIG. 3 at 312 may be included. Other components may include memory, and a LCD (liquid crystal display) or LEP (light emitting polymer) display.

The top and bottom printed core layer 606A and 606B may be of varying thicknesses. For example, the printed core layers 606 may be approximately five mil thick. The printed core layers 606 may be made of a variety of materials. For example, the top and bottom printed core layers 606 may be comprised of Polyvinyl chloride (PVC), Polyethylene terephthalate (PET), a thermoplastic polymer resin, or similar materials or combinations of materials. The top printed core layer 606A may be made of a different material than the bottom printed core layer 606B. According to alternative embodiments, glass fiber or other plastics may be used for the printed core layers 606. The top and or bottom printed core layers 606 may contain printed, embossed, engraved, etched, or otherwise marked information. For example, data identifying a customer, such as an account code, a customer name, an account number, a security code, an expiration date, a bar code, a hologram, or other identifying data, may be included. Marketing indicia such as logos, financial institution affiliations, payment networks, rewards program information, business partner identifiers, issuers, contact information (e.g., websites, phone numbers, addresses), slogans, and/or trademarks may be also included. According to other embodiments, a picture provided by a customer, partner, issuer, or other party may be included in the printed core layer 606. The printed core layer 606 may contain data magnetically stored on a magnetic tape or strip embedded into and/or on top of the layer.

According to exemplary embodiments, the card may contain a laser engraving of the cardholder's signature. For example, the engraved signature may be an exact replica of the cardholder's actual signature. The signature may be applied to the card prior to providing and/or issuing the card to the cardholder. The laser engraving of the signature may be done in a suitable material and layer of the transaction card. For example, the laser engraving may be done in a one of the printed overlay layers. For example, the signature may be engraved in the top printed overlay layer 606A. In such a case, the top printed core layer 606A may be a different material than the bottom printed core layer 606B to accommodate the laser engraving. The signature may be engraved on the back side of the card in the bottom printed core layer 606B. Alternatively, both sides of the card may feature the laser engraving. The location of the engraved signature on the transaction card may vary. For example, the signature may be located in the bottom right hand corner of the front of the card, as shown in FIG. 4. In alternative embodiments, the signature may be located at a fixed position for each card; that is, each card has the signature affixed in a pre-determined location. In other embodiments, the signature may be located at a position selected by the cardholder.

Other elements of the card may be laser engraved. For example, the account number may be engraved. The cardholder's name may be engraved in plain block printed letters, as shown in FIG. 1 at 116, for example. This name may be located either with the signature or at another location on the card, located apart from the signature.

A material such as calendered rigid vinyl may be used for the laser engraving. This material may be used for the printed core layer 606A and/or 606B. Calendered rigid vinyl may become in clear, translucent, or transparent coloring. By way of non-limiting example, the preferred material may have the following characteristics:

Tensile strength at 73 deg. F. (psi) (ASTM D638)=5,000 to 7,000;
% Elongation yield (ASTM D638)=greater than or equal to 15%;
Notched Izod (ASTM D256)=1.75 to 3;
Hardness at 73 deg. F. (ASTM D2240)=70 to 80;
Heat Deflection Temperature at 264 (psi) (ASTM D648) =greater than or equal to 127 deg. F.;
Specific gravity (ASTM D792)=1.30 to 1.35;
Vicat (ASTM D1525)=greater than or equal to 154 deg. F.

Alternatively, other materials such as thermo-plastic or metal may be used. For example, brass may be used. The brass may be cartridge brass. These other materials may have characteristics that may differ from the aforementioned material characteristics.

Above and below the one or more printed core layers 606, an additional layer, such as a transparent overlay layer 608, may be used. For example, the transaction card may contain top and bottom transparent overlay layers 608A and 608B. The transparent overlay layers 608 may vary in thickness. For example, the transparent overlay layer 608 may be approximately two mils thick. The transparent overlay layer 608 may provide protection to the one or more printed card layers. For example, the transaction overlay layers 608 may provide scratch resistance to the transaction card. The transparent overlay layer 608 may also seal the transaction card and protect one or more layers and/or components of a card from environment hazards. For example, protection may be provided against moisture, dust, and other contaminants.

According to exemplary embodiments, the transparent overlay layer 608 may be capable of being engraved through. That is, the engraving of the signature and/or account number or other information on the card may be done through the transparent overlay layer 608. During such engraving, the transparent overlay layer 608 may be penetrated by the engraving process. Following the engraving, the transparent overlay layer 608 may be sealed to fill in and/or cover-up such penetrations. The sealant may be the same material as the transparent overlay layer 608.

The total combined thickness of the aforementioned plurality of layers may vary in size. For example, the total thickness may be between ten mils and sixty mils. The size parameters and dimensions of the transaction card may vary to accommodate one or more various electronic and electrical components of the card. The thickness of the combined plurality of layers may conform to a standard thickness for credit cards; for example, thirty mil. According to exemplary embodiments, the dimensions of the transaction card may comply with the ISO/IEC 7810 standard. The length and width parameters of the card may be similar to the length and width of conventional magnetic type or smart cards, such as, but not limited to, a thickness of about 0.035 inches or less. The length and width of the card may also vary, for instance from about 0.5 inch to about 4 inches. Other dimensions are possible.

Figure 7:
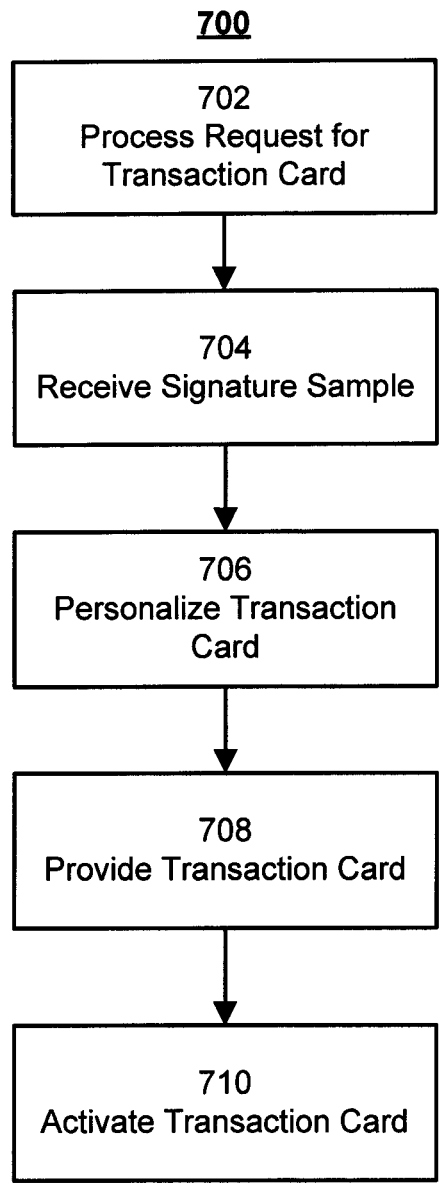
FIG. 7 is a method for personalizing a transaction card in accordance with an exemplary embodiment.

FIG. 7 depicts a method according to exemplary embodiments. Exemplary method 700 is provided by way of example, as there are a variety of ways to carry out the methods disclosed herein. The method 700 as shown in FIG. 7 may be executed or otherwise performed by one or a combination of various systems, such as a computer implemented system. Each block shown in FIG. 7 represents one or more processes, methods, and/or subroutines carried out in the exemplary method 700. Each block may have an associated processing machine or the blocks depicted may be carried out through one processor machine.

While the method of FIG. 7 illustrates certain steps performed in a particular order, it should be understood that the embodiments of the present invention may be practiced by adding one or more steps to the processes, omitting steps within the processes and/or altering the order in which one or more steps are performed.

At block 702, a request for a transaction card is processed. The request, or application, may be received by a financial institution or a third party associated with the financial institution. In some embodiments, the request may be received by the financial institution, initially processed, and forwarded to a third party for additional processing. The request may be received through any number of means in various formats, consisting of both hard and soft copy formats, such as mail, email, or web-based submission. The request may be received in a combination of formats. The request may be received from a present customer of the financial institution. For example, an existing bank customer (that is, a customer who uses the financial institution on a regular basis and/or maintains at least one account with the financial institution) may fill out an application for a transaction card and submit it to the bank. The request may be in response to a solicitation to apply for the transaction card. Alternatively, the request may be made of the customer's own initiative. In some embodiments, an applicant may not be a current customer of the financial institution; that is, the customer is a potential customer of the financial institution. The request may be processed following receipt to ensure that the applicant meets appropriate standards for the transaction card. It should be appreciated that some requests may be denied for the card for various reasons as known in the art.

At block 704, a signature sample is received and processed. The signature sample may be requested by the financial institution following the processing of the request for the card. For example, once the request is processed and approved, the bank may send a request to the applicant to provide an appropriate signature sample for use with the transaction card. In some embodiments, the signature sample may be provided as part of the initial request at block 702. In such a case, the applicant's signature from the application may be used. The signature sample may be submitted in various formats as preferred by the financial institution. For example, the bank may require an electronic signature, captured by a computer system. The applicant may be provided different options on supplying a signature. The received signature may be processed appropriately for engraving onto the transaction card. For example, the signature may be processed in a computer system into a specific format for use with a laser engraving system.

At block 706, the transaction card is personalized. The transaction card may be pre-built in "blank" state and a stock of such transaction cards kept on hand. Once the request for the transaction card is processed, approved, and the signature obtained, a blank transaction card may be personalized for the applicant. The personalization may include engraving of the account number and signature onto the blank card. In some embodiments, additional information may be engraved. In alternative embodiments, the personalization may occur by embossing or thermal printing. A combination of methods may be used to personalize the transaction card. For example, engraving and embossing may be used. The applicant, now a prospective cardholder, may be given options for personalization of the transaction card. For example, the applicant may choose the transaction card shape, such as one of the card embodiment described above, and location of the signature on the transaction card. The applicant may be able to choose the font and color for the signature and other personalized features for the transaction card.

At block 708, the transaction card is provided to the applicant. For example, the transaction card may be provided to the applicant in the mail or in-person.

At block 710, the transaction card is activated. The account or accounts associated with the transaction card may be pre-built in a frozen or inactive status. Accordingly, following receipt of the transaction card, the card has to be activated by the cardholder. The cardholder may call a phone number or visit a website to activate the card. In alternative embodiments, the card may be provided to the cardholder in an active state; that is, the card may be usable upon receipt with no additional steps or activation required.

According to exemplary embodiments, a transaction card, such as the embodiments described herein, may have a computer chip embedded or affixed therein. The computer chip may provide certain functionality to the transaction card. The computer chip may incorporate RFD or similar communications technology. For example, NFC (near field communications) may be used. Other communications technology may be employed using different methods, such as cell phone or wireless communication. The communications feature of the card may be actuated by being in proximity to a sensor. The card may be keyed to a particular sensor type or signal. The sensor may establish a communications link with the card to exchange information and actuate the card. Upon activation, the computer chip may provide a signal indicating information about the transaction card. The signal may be audible or electronic. The operation of such a feature will now be described by way of non-limiting example.

For example, the transaction card may be a stored value card containing a certain value in funds that have been loaded thereon or associated with the card. The cardholder may enter a retail establishment; for example, a retail store or other type of merchant. The store may have a sensor located near an entrance. Once the cardholder passes by the sensor, with the stored value card, the sensor may actuate the computer chip on the stored value card and data may be exchanged between the computer chip and a computer system associated with the sensor. Upon such actuation and following the data exchange, the stored value card may emit an audible signal which would remind the customer of the stored value card's presence. The stored value card may be actuated because it is associated with the particular merchant. The sensor may emit a coded signal that only will actuate particular stored value cards. The stored value card may incorporate a digital display upon which the card value may be displayed. The display of the value may accompany the audible signal upon actuation by the sensor. For example, upon hearing the audible signal, the cardholder may pull out the stored value card and look at the display. Alternatively, the actuation of the card may trigger an electronic signal, to be generated from the stored value card or the sensor, after communicating with the stored value card. The electronic signal may be sent to a personal electronic device associated with the cardholder. The personal electronic device may be a cell phone, personal data assistant, or smart phone. The electronic signal may be in the form of a electronic communication, such as a text message or email message or similar electronic communication. The electronic communication may provide the cardholder with information pertaining to the stored value card, such as the value contained thereon. Other such variants are possible.

The cardholder may be able to configure options relating to the above described features. For example, the cardholder may be able to use an internet based website to configure the features regarding notification, such as notification method. The options may be uploaded to the stored value card by the sensor upon establishing a link with the stored value card. For example, a cardholder may elect to receive a text message or an e-mail message, or both.

Figure 8:
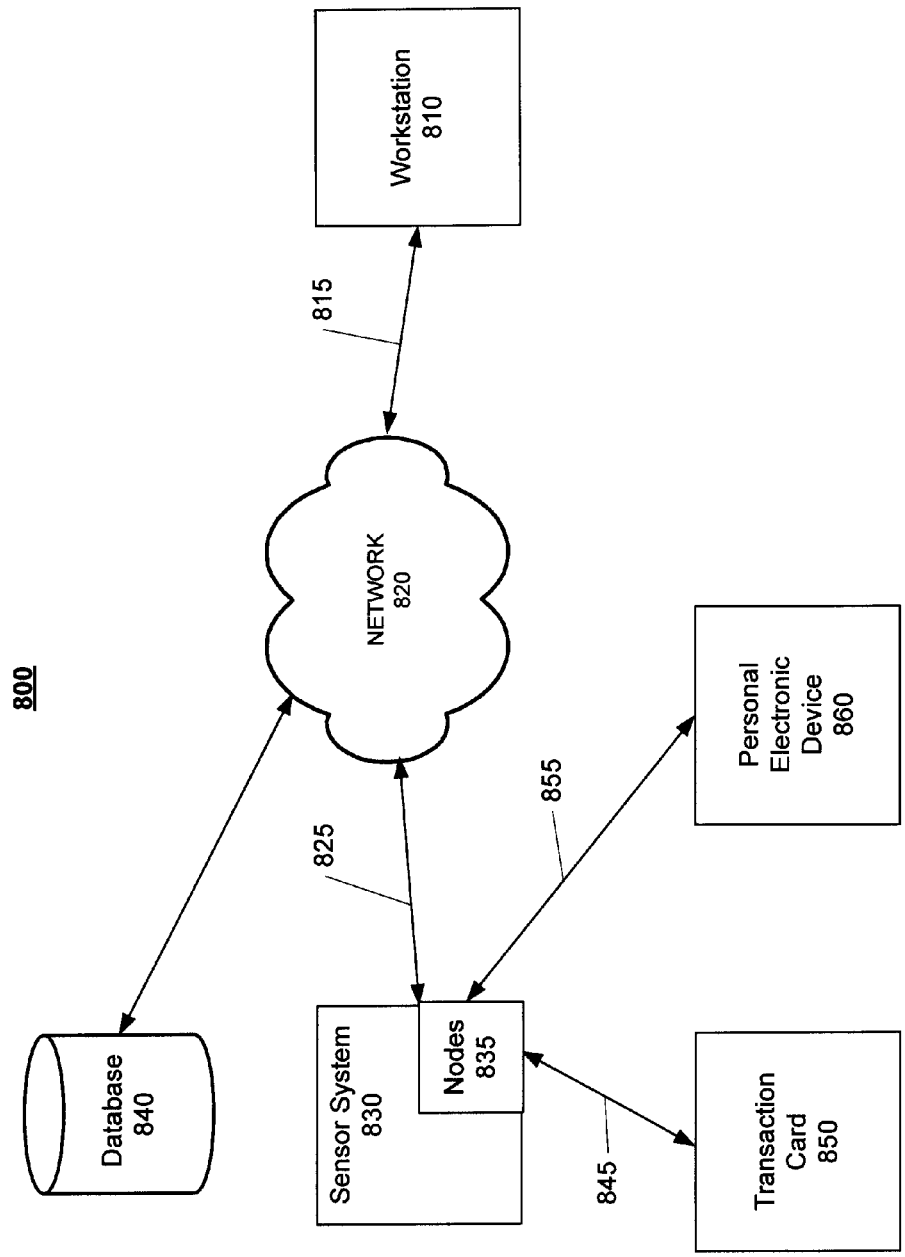
FIG. 8 is a system for using a transaction card in accordance with an exemplary embodiment.

Referring to FIG. 8, the aforementioned embodiment will be described. FIG. 8 is a system for actuating features of a transaction card, according to exemplary embodiments. System 800 may provide various functionality and features associated with transaction cards. More specifically, system 800 may include a workstation 810, a network 820, a sensor system 830, sensor or communications nodes 835, a database 840, a transaction card 850, and a personal electronic device 860. These components may be connected by various communications paths 815, 825, 845, and 855. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that system 800 may be integrated into and run on a computer, such as a general purpose computer which may include a processing machine which has one or more processors. Such a processing machine may execute instructions stored in a memory to process the data. System 800 may be integrated into and run on one or more computer networks which may each have one of more computers associated therewith.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

According to exemplary embodiments, the system 800 may be configured to carry out methods and functions as described herein. For example, the system 800 may be used to carry out the method of FIG. 9. The system 800 may have a workstation 810 associated therewith. The workstation 810 may be a single workstation or it may be multiple workstations that may be further associated with the system 800. The workstation 810 may be a processing machine, such as a general purpose computer. The workstation 810 may include software and/or modules to implement the method according to exemplary embodiments. The workstation 810 may provide processing, display, storage, communications, and execution of commands in response to inputs from a user thereof and respond to requests from the software and/or modules. The workstation 810 may serve as a client side. The workstation 810 may be a fat client, such that the majority of the processing may be performed on the client. Alternatively, the workstation 810 may be a thin client, such that the majority of the processing may be performed in the other components of the system 800. The workstation 810 may be configured to perform other functions and processing beyond the methods and functions described herein. The workstation 810 may be a part of a larger system. That is, the workstation 810 may be multi-functional in operation.

The workstation 810 may be communicatively coupled to a network 820 through a communications path 815. The communications path 815 may be a wired communications path or a wireless communications path. The network 820 may be a computer based network, comprising one or more servers and/or computer processors. For example, the network 820 may be the internet. Information and data may be exchanged through the network 820 between the various components of the system 800. In alternative embodiments, the network 820 may be a local area network. It should be appreciated that the network 820 may be a combination of local area networks, wide area networks, and external networks.

A sensor system 830 may be communicatively coupled through a communications path 825 to the network 820. The communications path 825 may be a wired communications path or a wireless communications path. The sensor system 830 may have one or more computers and/or servers associated therewith, with one or more computer processors associated each therewith. The sensor system 830 may have components located at disparate locations, the components may be coupled through a computer network, such as the network 820. The sensor system 830 may have one or more communications nodes 835 communicatively coupled thereto. The communications nodes 835 may be wireless communications points or radio frequency transceivers, capable of receiving and transmitting electronic data, on one or more frequencies. The communications nodes 835 may be located at various locations. For example, the communications nodes 835 may be located at multiple locations in a retail establishment. The communication nodes 835 may emit a particular signal that is coded for certain transaction cards as described herein. For example, the signal may identify the particular retail establishment. The communications nodes 835 may be active in emitting a signal to attempt to link with a transaction card. The sensor system 830 may have appropriate storage for data associated therewith or communicatively coupled thereto, such as a database 840.

The database 840 may contain data and instructions used by the system 800 or the sensor system 830. Additional information maybe contained therein related to the operation and administration of the system 800. The database 840 may include any suitable data structure to maintain the information and allow access and retrieval of the information. For example, the database may keep the data in an organized fashion. The database 840 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 840 may be stored in any suitable storage device. The storage device may include multiple data storage devices. The multiple data storage devices may be operatively associated with the database 840. The storage may be local, remote, or a combination thereof with respect to the database. The database 840 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fibre Channel SAN, a common Internet File System (CIFS), network attached storage (NAS), or a network file system (NFS). The database may have back-up capability built-in. Communications with the database 840 may be over a network, such as the network 820, or communications may be over a direct connection between the database 840 and the sensor system 830. The database 840 may have both types of connections. Data may be transmitted and/or received from the database 840. Data transmission and receipt may utilize a cabled network. A wireless network may be used for the transmission and receipt of data.

A transaction card 850 may be part of the system 800. The transaction card may be communicatively coupled with the sensor system 830 through a communications path 845. The communications path 845 may be a wireless communications path or a radio frequency communications path. The transaction card 850 may be configured as described herein. The transaction card 850 may have RFID or other communications capability to interface with the sensor system 830 over the communications path 845 and the communication nodes 835. The transaction card 850 may be programmed or otherwise configured to respond to a particular signal associated with the communications nodes 835. The transaction card 850 may be more than one transaction card and may be any type of transaction card. For example, the transaction card 850 may be a credit card, a debit card, a stored value card, or a gift card. The transaction card 850 may be a single transaction card with multiple accounts associated therewith. For example, the transaction card 850 may be a credit card with a stored value feature.

The system 800 may have one or more personal electronic devices 860 associated therewith. The personal electronic device 860 may communicate with the communications nodes 835 over a communications path 855. Alternatively, the communications path 855 may couple with sensor system 830. The communications path 855 may couple to both the sensor system 830 and the communications nodes 835. The communications path 855 may be a wireless communications path. For example, the communications path 855 may be a cellular communications path. The personal electronic device 860 may be associated with a cardholder of the transaction card. The personal electronic device 860 may be any portable computing device. For example, the personal electronic device 860 may be a cellular phone, a PDA, or a smart phone.

Figure 9:
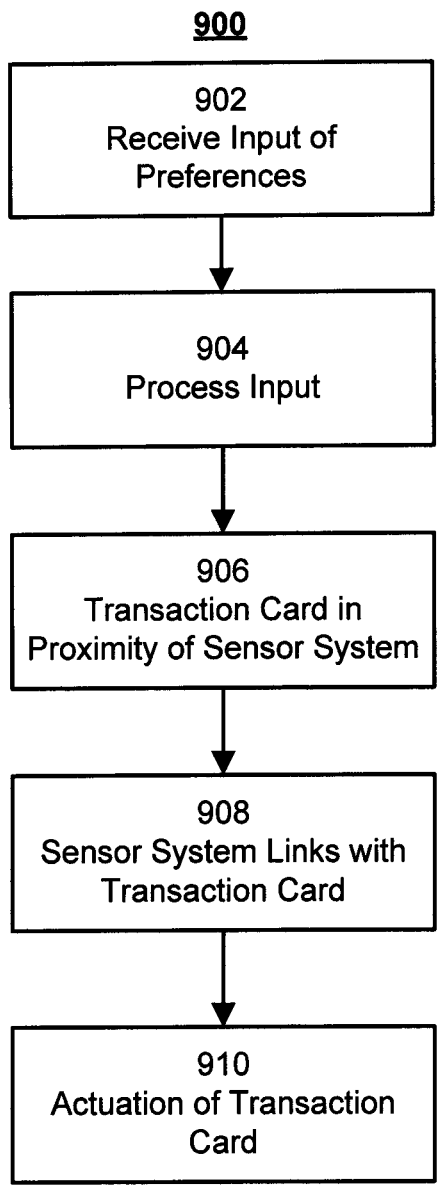
FIG. 9 is a method for using a transaction card in accordance with an exemplary embodiment.

FIG. 9 depicts a method according to exemplary embodiments. Exemplary method 900 is provided by way of example, as there are a variety of ways to carry out the methods disclosed herein. The method 900 as shown in FIG. 9 may be executed or otherwise performed by one or a combination of various systems, such as a computer implemented system. Each block shown in FIG. 9 represents one or more processes, methods, and/or subroutines carried out in the exemplary method 900. Each block may have an associated processing machine or the blocks depicted may be carried out through one processor machine.

While the method of FIG. 9 illustrates certain steps performed in a particular order, it should be understood that the embodiments of the present invention may be practiced by adding one or more steps to the processes, omitting steps within the processes and/or altering the order in which one or more steps are performed.

At block 902, an input is received. The input may be received by a system according to exemplary embodiments. For example, the system 800 may be used for the input. The input may be a single input or multiple inputs. The input may be received from a cardholder of a transaction card according to exemplary embodiments. The transaction card may be any type of transaction card. By way of non-limiting example, the transaction card may be a credit card, a debit card, a stored value card, a gift card, or a rewards card. The transaction card may be configured to interact with the system according to exemplary embodiments. For example, the transaction card may have an RFID chip and/or a computer chip associated with the transaction card capable of interacting with the system described herein.

The input may be conducted using a workstation, such as a general purpose computer connected to a computer based network. For example, a cardholder may use a personal computer to access a website on the internet. The cardholder may choose from a menu of options to configure the features of the transaction. For example, the cardholder may configure the notification mechanism to be used for the transaction card when interacting with a system according to exemplary embodiments.

During the input process to configure the preferences, the cardholder may be required to enter a code associated with transaction card. The code may be used to link the preference to the card and determine the routing of further processing of the input. For example, the account number associated with the transaction card may be used.

At block 904, the input is processed. The processing may occur at a server associated with the system. For example, the sensor system may process the input. The processing of the input may involve validating the input and storing the input. The validation of the input may be conducting by ensuring the code enter corresponds to a valid transaction card. The input may be forwarded to subsequent computer systems for later access.

At block 906, the transaction card is brought into proximity of the sensor system. For example, the cardholder may enter a retail establishment configured with a system according to exemplary embodiments. The cardholder may have the transaction card on their person. The cardholder may pass at an appropriate distance from a sensor or communications node of the sensor system. The distance may vary. For example, the distance may be 3 to 6 feet. The sensor system may be configured to actively transmit to link with and communicate with the transaction card. As described above, the sensor system may transmit a particular code or key associated with the particular retail establishment. The transaction card may be configured to be actuated upon receiving the particular code or key. For example, a gift card from a home improvement store may have a code associated with it. That is, the gift card's computer chip is program to only be activated upon receiving the code. Upon movement of this gift card into proximity with a sensor in the home improvement store, the computer chip in the transaction card may be activated upon receipt of the code emitted from the sensor system of the home improvement store.

At block 908, the sensor system links with the transaction card. The sensor system links with the transaction card after successful activation of the computer card. The link may be by a wireless link. For example, the link may be an RFID link. Upon establishment of the link, data can be exchanged.

At block 910, the transaction card is activated. The activation of the transaction card may cause the card to perform an action. The action performed may be based on the input received at block 902. The exchange of data at block 908 may include instructions on the action to be performed. The action may be any one of a number of actions. For example, the transaction card may emit an audible tone. The audible tone may then remind the cardholder of the presence of the transaction card. Such a reminder may encourage the cardholder to use the transaction card. The action may include having the sensor system forward an electronic message to the cardholder through a personal electronic device. For example, upon the successful link at block 908, the sensor system may cause a text message or email to be forwarded at smart phone associated with the cardholder. The cardholder may have preconfigured the format and destination of this electronic communication at block 902. The electronic communication may indicate the balance remaining on or associated with the transaction card.

In some embodiments, the transaction card may indicate to the cardholder the balance remaining on the transaction card. For example, the transaction card may emit an audible message indicating the balance on the transaction card using a voice. For example, digitized voice may say "You have $50 of remaining balance," or a similar phrase. This option may be configured at block 902. It should be appreciated that not all transaction cards may have this feature or capability. The actuation of the card may involve multiple actions based on the preferences selected by the cardholder. In alternative embodiments, the transaction card may emit an audible tone to remind the cardholder of its presence. The transaction card may also incorporate a digital screen, such as an LCD or LEP screen, upon which information associated with the card may be displayed. For example, the link with the sensor system may cause the balance amount to be displayed upon the digital screen. The cardholder may then view the balance information after being prompted by the audible signal to do so.

It should be appreciated that the method has applicability especially to stored value cards, gift cards, and rewards cards. However, it should be appreciated that the method may be applicable to credit cards and debit cards of exemplary embodiments. In such cases, the actions may be different. For example, credit cards and debits may send an electronic communication to the cardholder with balance information.

Hereinafter, aspects of implementation of the embodiments of the systems and methods described herein will be described. As described above, the system may be computer implemented. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. For example, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, REXX, Ruby, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of media or medium, as desired. Further, the data for example processed by the set of instructions might also be contained on any of a wide variety of media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

The present invention is not limited to the aforementioned embodiments. Other embodiments of the present invention can be easily envisioned by those skilled in this art without departing from the scope of this invention, as defined in the following claims.

While the embodiments have been particularly shown and described within the framework of a transaction card, including a multi-layer transaction card, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, uses and advantages of the present invention will be apparent to those skilled in the art from consideration of the specification and practice of the invention disclosed herein. The specification and examples should be considered exemplary. The intended scope of the invention is limited by the claims appended hereto.

What is claimed is:

1. A method for personalizing a transaction card, comprising;
    receiving, by at least one computer processor, a request for the transaction card, wherein the request is from a prospective cardholder;
    receiving a signature of the prospective cardholder;
    processing, by the at least one computer processor, the signature;
    engraving the signature into the transaction card, wherein the transaction card comprises metal core having a first side and a second side, the transaction card further having a plurality of layers surrounding the metal core, the plurality of layers comprising a first overlay layer on the first side and the second side, a printed core layer on top of the first overlay layer on the first side and the second side, and a second overlay layer on top of the printed core layer on the first side and the second side, and the engraving is performed into the printed core layer on either the first or second side and at least a portion of the printed core layer comprises calendered rigid vinyl;
    providing the transaction card to the prospective cardholder wherein the prospective cardholder becomes a cardholder; and
    activating the transaction card at the request of the cardholder.

2. The method of claim 1, wherein the engraving is done by laser engraving.

3. The method of claim 1, wherein the transaction card comprises at least one of:
    a credit card, a debit card, an ATM card, a stored value card, a rewards card, or a gift card.

4. A method for personalizing a transaction card, comprising;
    receiving, by at least one computer processor, a request for the transaction card, wherein the request is from a prospective cardholder;
    receiving a signature of the prospective cardholder;
    processing, by the at least one computer processor, the signature;
    laser engraving the signature into the transaction card wherein the transaction card comprises a plurality of layers surrounding a core wherein the core has a first side and a second side, the plurality of layers comprising a first overlay layer on the first side and the second side, a printed core layer on top of the first overlay layer on the first side and the second side, and a second overlay layer on top of the printed core layer on the first side and the second side, and the laser engraving is performed into the printed core layer on either the first or second side and at least a portion of the printed core layer comprises calendered rigid vinyl;

providing the transaction card to the prospective cardholder wherein the prospective cardholder becomes a cardholder; and activating the transaction card at the request of the cardholder.

5. The method of claim 4, wherein the core of the transaction card comprises a metal core.

6. The method of claim 4, wherein the transaction card, at least partially, contains metal.

7. The method of claim 4, wherein the laser engraving is done into a layer of the transaction card, the layer comprising calendered rigid vinyl.

8. The method of claim 4, wherein the transaction card comprises at least one of:
a credit card, a debit card, an ATM card, a stored value card, a rewards card, or a gift card.

9. The method of claim 4, wherein the laser engraving is performed through the second overlay layer.

10. The method of claim 9, wherein the second overlay layer is sealed following the laser engraving.

* * * * *